United States Patent [19]

Suzuki et al.

[11] Patent Number: 4,685,528
[45] Date of Patent: Aug. 11, 1987

[54] ELECTRIC POWER STEERING DEVICE FOR A MOTOR VEHICLE

[75] Inventors: Mikio Suzuki, Hekinan; Shigeo Iwashita; Masaaki Hayashi, both of Okazaki, all of Japan

[73] Assignee: Toyoda Koki Kabushiki Kaisha, Kariya, Japan

[21] Appl. No.: 839,542

[22] Filed: Mar. 14, 1986

[30] Foreign Application Priority Data

Mar. 29, 1985 [JP] Japan .................................. 60-68051

[51] Int. Cl.$^4$ .............................................. B62D 5/04
[52] U.S. Cl. .................................... 180/79.1; 364/424
[58] Field of Search ............... 180/79.1, 142; 364/424, 364/425; 74/388 PS

[56] References Cited

U.S. PATENT DOCUMENTS

| | | | |
|---|---|---|---|
| 2,454,070 | 11/1948 | Le Tourneau | 180/70.1 X |
| 2,860,717 | 11/1958 | Jedrzykowski et al. | 180/53.1 |
| 4,437,532 | 9/1984 | Nakamura et al. | 180/142 |
| 4,471,280 | 3/1984 | Stack | 318/586 |
| 4,538,698 | 9/1985 | Hashimoto et al. | 180/79.1 |
| 4,582,155 | 4/1986 | Ohe | 180/79.2 |

OTHER PUBLICATIONS

Automotive Technology Series, vol. 10, supervised by Takeshi Saito, published Oct. 5, 1980, p. 42.

Primary Examiner—John A. Pekar
Attorney, Agent, or Firm—Oblon, Fisher, Spivak, McClelland, & Maier

[57] ABSTRACT

In an electric power steering device, an electric motor is drivingly connected to a steering shaft with a steering wheel for generating an assisting power to rotate the steering shaft. A memory has stored a control pattern which non-linearly varies an assisting power with variations in a steering effort. A microprocessor responsive to a vehicle speed detected by a speed sensor ascertains whether the detected vehicle speed is within a low speed range or within a high speed range. Ascertaining that the detected speed is within the low speed range, the microprocessor searches the memory for an assisting power corresponding to the steering effort detected by a torque sensor. Ascertaining that the detected vehicle speed is within the high speed range, on the other hand, the microprocessor calculates an assisting power based upon the detected steering effort and a constant. The microprocessor then outputs a control signal representing either of the searched and calculated assisting power to a signal modulator, which modulates the control signal based upon the vehicle speed from the speed sensor so that the assisting power generated by the electric motor is controlled to meet the modified signal from the signal modulator.

5 Claims, 9 Drawing Figures

ELECTRIC POWER STEERING DEVICE FOR A MOTOR VEHICLE

BACKGROUND OF THE INVENTION

1. Field of the Invention

The present invention relates to an electric power steering device of the type wherein an electric motor generates an assisting power to rotate a steering shaft of a motor vehicle.

2. Discussion of the Prior Art

Generally, in power steering devices, the ratio of a total steering power to a manual steering force or effort (hereafter referred to as "power assisting gain") is varied based upon various conditions such as vehicle speed, steering angle, steering angular velocity, road condition or the like so as to improve the steering feeling and the controllability. The total steering power which is required to operate the vehicle steering mechanism varies with variations in a resistance (i.e., steering load) that the steering shaft receives from a road surface, namely with the dependency of a steerable wheel restitution force upon the steering angle, as shown in FIGS. 7(a) and 7(b). This dependency varies with variations in the vehicle speed, the friction coefficient between tires and the road surface, the steering angular velocity, the direction in which the absolute value of the steering angle varies (i.e., further turn or return) or the like. The steering is easy if the required steering effort becomes smaller as the vehicle speeds decreases and does not increase as the steering wheel is further turned. However, the stability in high speed running is improved if the required steering effort is largely increased or made larger with increases in the steering angle.

By the way, known power steering devices are classified into hydraulic and electric types. Either type of these power steering devices is responsive to the vehicle speed, wherein a gain characteristic curve appropriate thereto is used to be amplified in accordance with a parameter of vehicle speed.

However, the hydraulic power steering devices have such a relation as shown in FIG. 6(b) between the steering load (which is proportional to the total assisting power in a condition that the steering angular velocity is constant) and the steering effort. More specifically, as the steering effort exceeds a predetermined value, the assisting power abruptly increases. This characteristic is advantageous for low speed running, because it provides for not only a proper stability of a steering wheel at the neutral position, but also a large assisting power with a small manual steering torque. However, when the gain of the characteristic shown in FIG. 6(b) is lowered for high speed running, the required steering effort does not increase at the same increasing rate as the the steering load. Thus, even when increases in the steering angle as well as in the steering angular velocity cause the steering load to increase, the required steering effort does not increase in proportion thereto. This provides the vehicle driver with an approximately constant steering feeling, thereby failing to obtain an enhanced controllability in high speed running.

On the other hand, in known electric power steering devices, the required steering effort is controlled to increase linearly with increases in the steering load, as shown in FIG. 6(a), and the gain (gradient) of the variation of the assisting power relative to the steering effort is changed with the vehicle speed. Therefore, the characteristic of the steering effort thus obtained is analogous to the characteristic according to which the steering load increases with increases in the steering angle and the steering angular velocity. This permits the steering wheel to become heavier as increases in the steering angle and the steering angular velocity so as to thereby provide for such a stability as required for high speed driving. However, according to the variation characteristics of the steering effort, the steering wheel becomes heavier with increases in the steering angle and the vehicle speed. Particularly, when the vehicle speed is zero, the steering load is extremely large to make the steering wheel too heavy to turn.

SUMMARY OF THE INVENTION

Accordingly, it is a primary object of the present invention to provide an improved electric power steering device capable of making the steering feeling light even at large steering angles during low speed running and also making the steering effort characteristic proportional to a characteristic that the steering load has relative to the steering angle during high speed running, so as to improve the stability.

Briefly, according to the present invention, there is provided an electric power steering device, which comprises a torque sensor for detecting a steering effort manually applied to a steering shaft of the vehicle, a vehicle speed sensor, an electric motor for generating an assisting power to rotate the steering shaft, and a gain controller for changing the ratio (amplification degree) of the assisting power generated by the electric motor to the applied steering effort. The gain controller includes a speed ascertaining device for ascertaining whether the speed detected by the speed sensor is within a low speed range or a high speed range, first and second controllers, and a drive device for driving the electric motor based upon outputs from the first and second controllers. When the vehicle speed is ascertained to be within low speed range, the first controller controls the assisting power in accordance with a first characteristic which non-linearly increases the assisting power with increases in the steering effort and makes the increasing ratio larger as the vehicle speed decreases. When the vehicle speed is ascertained to be within a high speed range, the second controller controls the assisting power in accordance with a second characteristic which linearly increases the assisting power with increases in the steering effort and makes the increasing ratio smaller as the vehicle speed increases.

With this configuration, the vehicle speed is detected to ascertain whether it is within a low speed range or a high speed range. Within the low speed range, the assisting power generated by the electric motor is non-linearly controlled so that the required steering effort does not vary to a large extent relative to a large change in the steering load. Such non-linear control of the assisting power provides for a gain characteristic which is similar to those in hydraulic power steering devices. Within the high speed range, on the other hand, the assisting power is controlled almost linearly so that the required steering effort does vary to a large extent with a large change in the steering load. Thus, the assisting power generated by the electric motor is controlled in accordance with distinctive gain characteristics which are selected depending upon a parameter of the vehicle speed.

Preferably, the first and second controllers respectively provide for those characteristics of a first group (A) and those characteristics of a second group (B) as illustrated in FIG. 4. The drive device outputs an voltage which controls the load current or exciting current of the electric motor, in order that the electric motor generates an appropriate assisting power depending upon either of the signals output from the first and second controllers.

The modulation of the gain relative to the vehicle speed may be performed by searching a data map which has stored various assisting powers corresponding to various steering efforts as well as to various vehicle speeds. The gain modulation may otherwise be performed by providing a data map which has stored several reference characteristics determined for several predetermined vehicle speeds and by adjusting the magnification of an assisting power which is read out from the data map.

As described above, according to the present invention, the control pattern of the assisting power is varied for low speeds as well as for high speeds. Thus, during low speed running, the steering wheel is turned with a constant manual torque irrespective of the steering angle and the vehicle speed. During high speed running, on the other hand, the steering wheel is turned with a manual torque which varies in proportion to the dependency of the steering load upon the steering angle, so that a larger steering effort is required as the steering wheel is turned further away from the neutral position, thereby enhancing the stability during the high speed driving.

BRIEF DESCRIPTION OF THE ACCOMPANYING DRAWINGS

Various other objects, features and many of the attendant advantages of the present invention will be readily appreciated as the same becomes better understood by reference to the following detailed description when considered in connection with the accompanying drawings, wherein like reference numerals designate identical or corresponding parts throughout the several views, and in which.

Figure 6A:
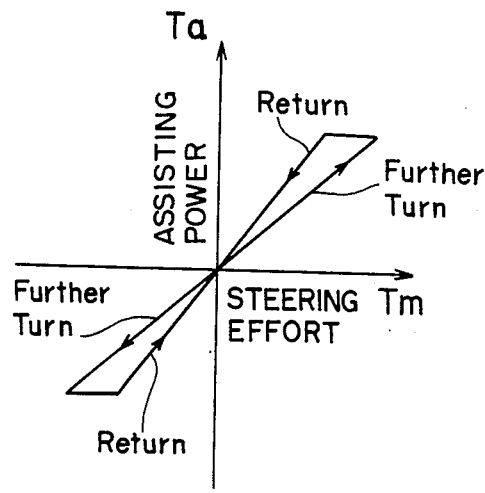
Figure 6B:
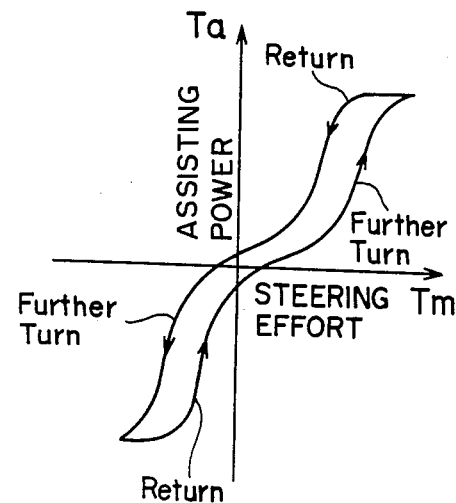
Figure 7A:
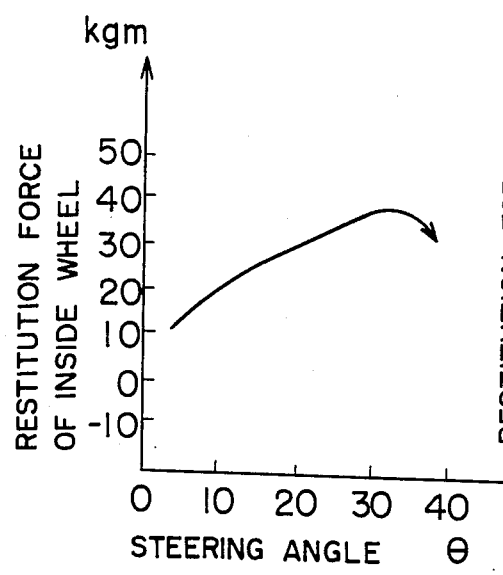
Figure 7B:
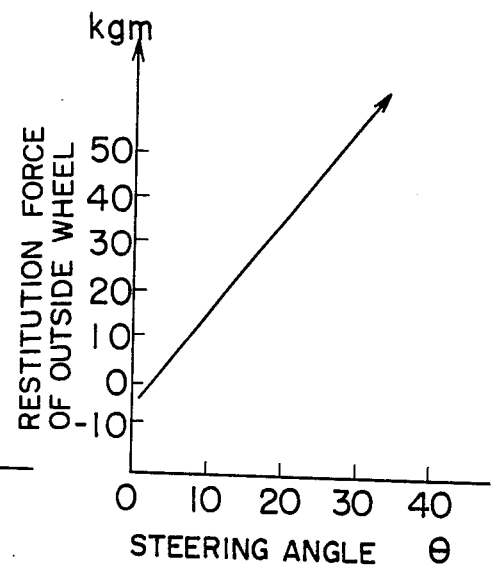

FIGS. 6(a) and 6(b) are graphs respectively showing respective assisting power characteristics of electric and hydraulic power steering devices known heretofore; and FIGS. 7(a) and 7(b) are graphs showing the relationship between restitution forces and steering angles.

DETAILED DESCRIPTION OF THE PREFERRED EMBODIMENT

Figure 1:
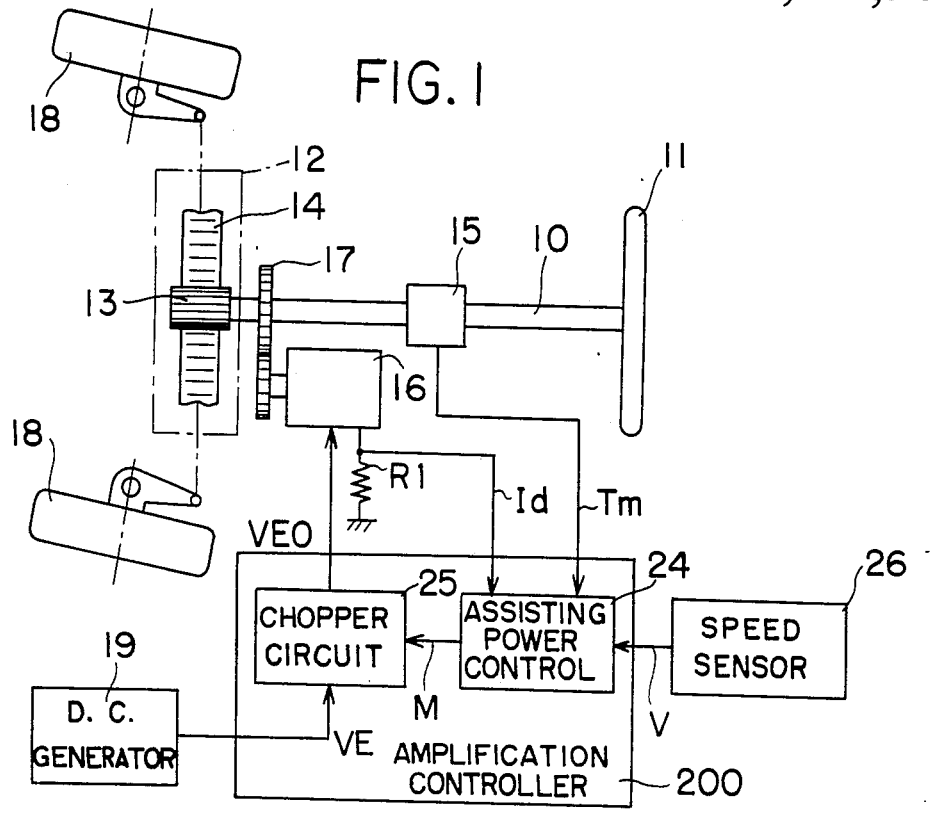
FIG. 1 is a schematic view of an electric power steering device with a control device therefor according to the present invention.

Referring now to the drawings and particularly to FIG. 1 thereof, numerical 10 denotes a steering shaft, which has a steering wheel 11 secured to one end thereof and a pinion shaft 13 connected thereto at the other end thereof and rotatably carried in a gear box 12. The pinion shaft 13 meshes with a rack 14 axially slidably received in the gear box 12. Although not shown, opposite ends of the rack 14 are connected to steerable wheels 18 through ball joints and the like, as is well known in the art.

The steering shaft 10 is provided thereon with a torque sensor 15 for detecting a manual steering force or effort applied to the steering wheel 11. Further, the steering shaft 10 is drivingly coupled through gears 17 to an electric motor 16 which generates an assisting power. A voltage (VE) from a d. c. generator or dynamo 19 drivingly connected to an automotive engine (not shown) is generated upon rotation of the engine and is input to a chopper circuit 25.

A gain or amplification controller 200 is composed of an assisting power control device 24 and the above-noted chopper circuit 25. The assisting power control device 24 receives a steering effort (Tm) from the torque sensor 15, a vehicle speed signal (V) from the vehicle speed sensor 26 and a load current (Id) from the electric motor 16. The assisting power control device 24 varies the power assisting gain (A) depending upon the vehicle speed signal (V) and the load current (Id) input thereto and outputs to the chopper circuit 25 a signal (M) which controls the load current (Id) in such a manner as to generate the assisting power Ta ($=A \cdot Tm$) depending upon the steering effort (Tm). When receiving the signal (M), the chopper circuit 25 supplies the electric motor 16 with a modulated voltage (VEO) to control the load current (Id) in such a manner as to meet the modulated voltage or objective value (VEO).

Figure 2:
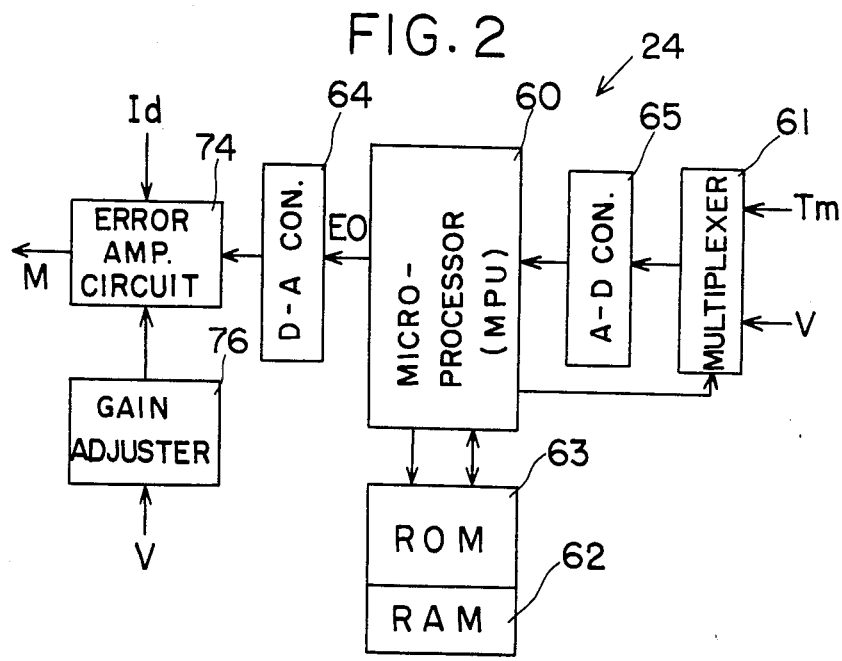
FIG. 2 is a block diagram of an assisting power control device shown in FIG. 1.

Referring now to FIG. 2 showing the detail of the assisting power control device 24 in the form of block diagram, the assisting power control device 24 is primarily composed of a digital computer, such as a microprocessor system. More specifically, the device 24 comprises a multiplexer 61 for receiving the steering effort (Tm) and the vehicle speed (V), an analogue-to-digital (A−D) converter 65 for converting each of the signals (Tm) and (V) into a corresponding digital signal, a microprocessor (hereafter referred to "MPU") 60, a read-only memory (ROM) 63 for storing system control programs and a data table for gain control data, a random access memory (RAM) for storing data input thereto, a digital-to-analogue (D−A) converter 64 for converting control signals from the MPU 60 into a corresponding analogue signal, an error amplifier circuit 74 for controlling the load current (Id) of the electric motor 16 to meet the control value, and a gain adjuster circuit 76 which operates as a velocity modulation section for modulating a reference assisting power given thereto based upon the vehicle speed (V).

Figure 3:
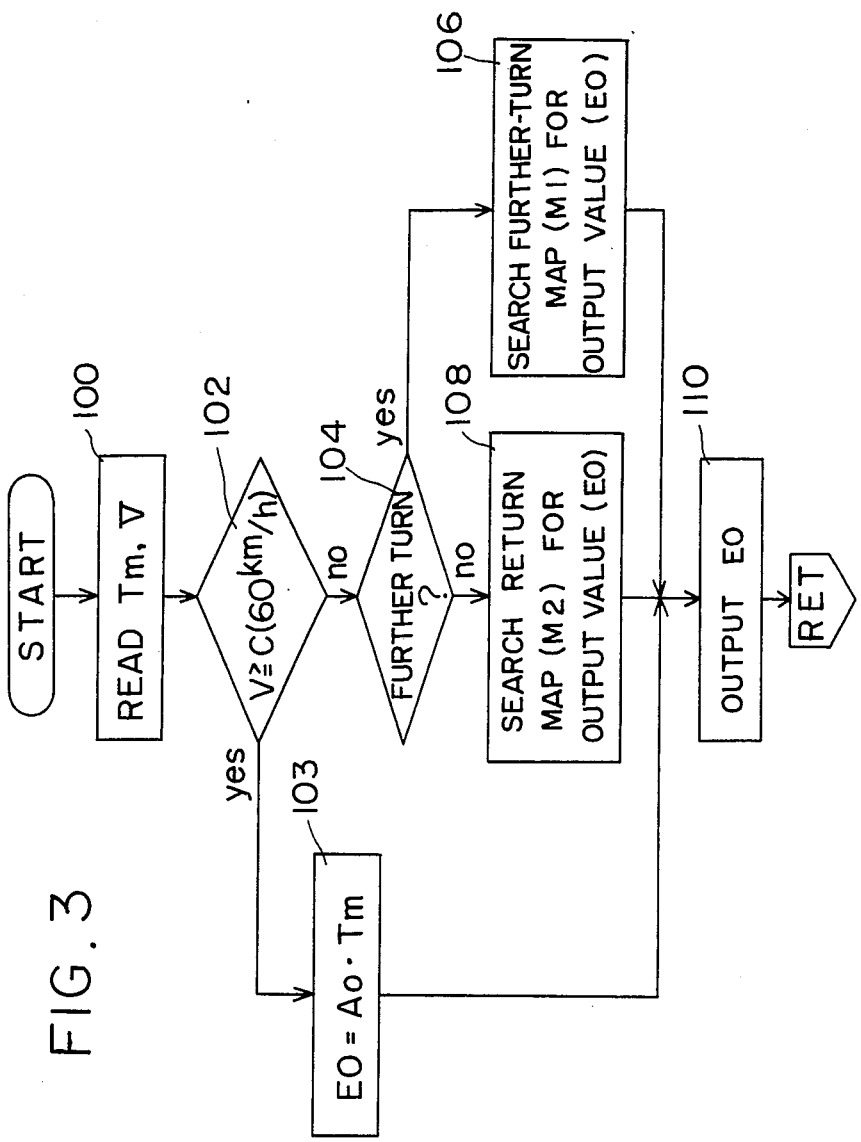
FIG. 3 is a flow chart of an assisting power control program executed by a microprocessor shown in FIG. 2.
Figure 5:
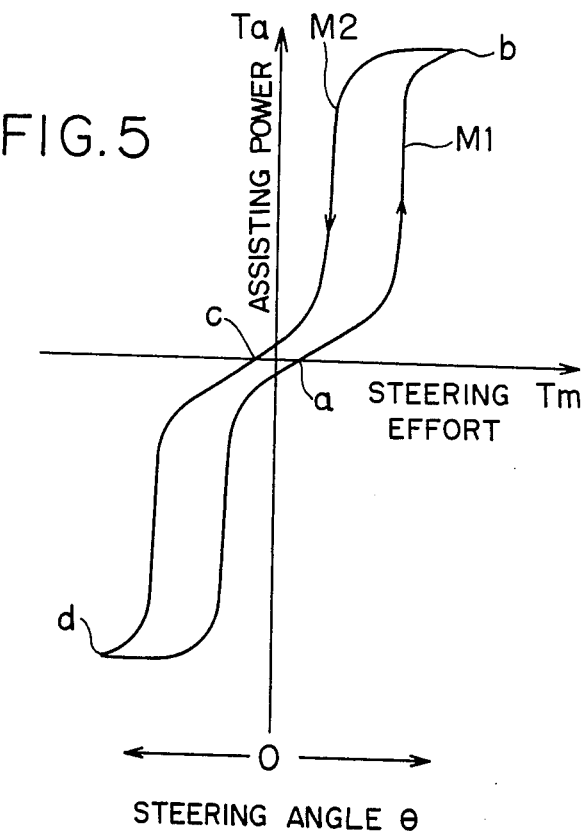
FIG. 5 is another graph showing the detail of the control characteristic shown in FIG. 4 for use in driving at the lowest speed.

FIG. 3 is a flow chart of processings executed by the MPU 60, and FIG. 5 is a graph representing power assisting characteristics at various vehicle speeds. The program shown in FIG. 3 is executed in response to an interrupt signal which is generated at a predetermined time interval or at a predetermined running distance interval. The steering effort (Tm) and the vehicle speed (V) are read in step 100. The vehicle speed (V) is compared with a preset value (C) (e.g., 60 km/h) in step 102, and if "no" is answered, that is if the vehicle speed (V) is within a low speed range, step 104 is reached to ascertain the moving direction of the steering wheel 11 with respect to the neutral position. That is, judgement is made as to whether the steering wheel 11 is being rotated in a further turn direction or in a return direction. Otherwise, such a judgement may be made by ascertaining whether the steering effort (Tm) tends to increase or decrease or may be made using a suitable steering angle sensor.

Figure 4:
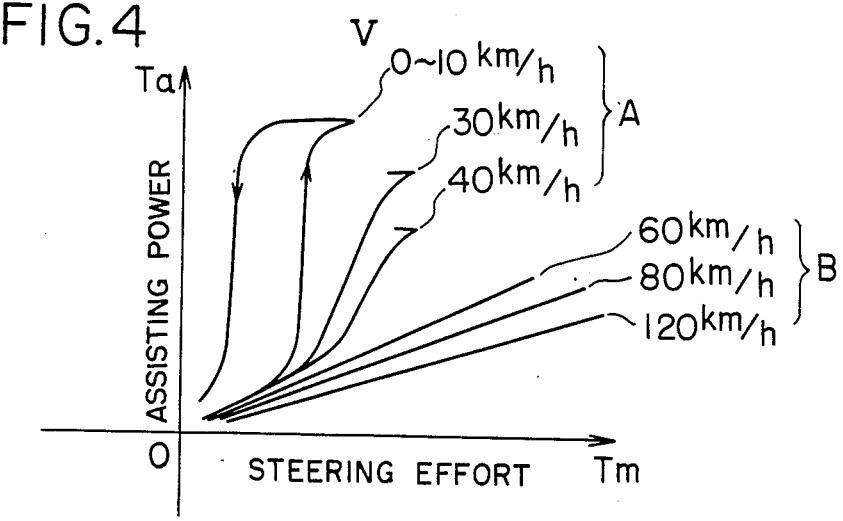
FIG. 4 is a graph showing the control characteristic (i.e., amplification characteristic) of an assisting power relative to a steering effort.

When the vehicle speed (V) is ascertained to be within the low speed range, the assisting power (Ta) is controlled in accordance with a reference amplification characteristic as shown in FIG. 5 which covers vehicle speeds ranging from 0 (zero) through 10 km/h, as noticed with reference to FIG. 4. The ROM 63 has beforehand stored this reference amplification characteristic in the form of maps, so that when the detected steering effort (Tm) is input as address data to the ROM 63, a corresponding one of mapped assisting powers (Ta) is selected to read out a control signal (EO) corresponding thereto. A characteristic segment which leads from a point (a) to another point (b) in FIG. 5 is used upon the rotation of the steering wheel 11 in the further turn direction, while the other characteristic segment which leads from the point (b) to still another point (c) is used upon the rotation of the steering wheel 11 in the return direction. Depending upon the rotational direction of the steering wheel 11, namely upon the further turn direction or the return direction, either of steps 106 and 108 is reached, wherein a characteristic map (M1) or (M2) is searched for a control signal (EO) representative of a selected assisting power (Ta). Step 110 is then executed, whereby the searched control signal (EO) is output to the error amplifier circuit 74 through the D−A converter 64.

The gain of the error amplifier circuit 74 is varied by the gain adjuster circuit 76. The gain adjustment is performed by varying the magnitude of a feedback resistance constituting a feedback circuit (not shown) of the circuit 74. As the gain adjuster circuit 76 adjusts the gain of the error amplifier circuit 74 based upon the vehicle speed (V), the output signal (M) from the error amplifier circuit 74 is modulated by the vehicle speed (V). Consequently, the characteristic of the assisting power (Ta) generated by the electric motor 16 is controlled in accordance with the characteristic of the voltage (VEO) applied to the electric motor 16 in such a manner that the reference characteristic for the lowest vehicle speed (0 through 10 km/h) is modulated based upon the vehicle speed (V). As a result, the characteristic of amplification within the slow speed range represents the characteristic having as parameters the speeds classified into a group (A) in FIG. 4.

To the contrary, when it is ascertained that the vehicle speed (V) is with the high speed range, a control signal (EO) at another reference speed (e.g., 60 km/h) which makes an assisting power (Tm) linearly proportional to the applied steering effort (Tm) is calculated in step 103 by multiplying the applied steering effort (Tm) by a constant (Ao) and is output to the error amplifier circuit 74 in step 110. The calculated control signal (EO) is modulated based upon the vehicle speed (V) in the aforementioned manner, and the modulated voltage (VEO) is applied to the electric motor 16. Consequently, the assisting power (Ta) generated by the electric motor 16 when the vehicle speed (V) is within the high speed range is controlled in accordance with one of those characteristics which respectively correspond to the vehicle speeds 60 km/h, 80 km/h and 120 km/h, as classified into the other characteristic group (B) in FIG. 4.

In the above-described manner, the characteristic of the assisting power (Ta) generated by the electric motor 16 is varied depending upon the steering effort (Tm) as well as the vehicle speed (V).

Obviously, numerous modifications and variations are possible in light of the above-teachings. It is therefore to be understood that within the scope of the appended claims, the present invention may be practiced otherwise than as specifically described herein.

What is claimed is:

1. An electric power steering device for a motor vehicle having a steering shaft manually rotatable by a driver, comprising:

a torque sensor for detecting a steering effort applied to the steering column;

a speed sensor for detecting the running speed of said motor vehicle;

an electric motor for generating an assisting power to rotate said steering shaft; and a control device for controlling the ratio of the assisting power generated by said electric motor to the steering effort detected by said torque sensor so as to vary the assisting power depending upon the detected steering effort, said control device comprising:

ascertaining means for ascertaining whether the vehicle speed detected by said speed sensor is within a low speed range or within a high speed range;

first characteristic control means operable when the vehicle speed is ascertained by said ascertaining means to be within said low speed range, for outputting a first control signal to control the assisting power in accordance with a first characteristic which nonlinearly varies the assisting power with variations in the steering effort in such a manner as to make the increasing rate of the assisting power larger as the vehicle speed decreases;

second characteristic control means operable when the vehicle speed is ascertained by said ascertaining means to be within said high speed range, for outputting a second control signal to control the assisting power in accordance with a second characteristic which is distinctive from said first characteristic with respect to the increasing rate of the assisting power relative to the steering effort and which linearly varies the assisting power with variations in the steering effort in such a manner as to make the increasing rate of the assisting power smaller as the vehicle speed increases; and motor drive means responsive to any of said first and second control signals from said first and second control means for driving said electric motor to generate as assisting power which meets said any of said first and second control signals.

2. An electric power steering device as set forth in claim 1, wherein said first characteristic control means comprises:

storage means for storing said first characteristic in which the assisting power at a reference speed within said low speed range non-linearly with variations in the steering effort;

read-out means for reading out from said storage means an assisting power corresponding to the steering effort detected by said torque sensor; and a signal modulator for modulating said read-out assisting power for said reference speed based upon the vehicle speed detected by said speed sensor so as to output to said motor drive means said first control signal representative of said modulated assisting power.

3. An electric power steering device for a motor vehicle having a steering shaft manually rotatable, comprising:
   an electric motor drivingly connected with said steering shaft for generating as assisting power to rotate said steering shaft;
   a torque sensor for detecting a steering effort applied to said steering shaft;
   a speed sensor for detecting the speed of said motor vehicle;
   ascertaining means for ascertaining whether the vehicle speed detected by said speed sensor is within a high speed range or within a low speed range;
   first control means responsive to the steering effort detected by said torque sensor for generating a first control signal representing an assisting power which is in accordance with a first characteristic which non-linearly increases the assisting power as the steering effort increases, when said vehicle speed is ascertained by said ascertaining means to be within said low speed range;
   second control means responsive to the steering effort detected by said torque sensor for generating a second control signal representing an assisting power which is in accordance with a second characteristic which linearly increases the assisting power as the steering effort increases, the average increasing rate of said first characteristic being larger than that of said second characteristic, when said vehicle speed is ascertained by said ascertaining means to be within said high speed range, said first and second characteristics being distinctive from each other with respect to the increasing rate of the assisting power relative to the steering effort;
   signal modulation means for modulating any of said first and second control signals from said first and second control means based upon the vehicle speed detected by said speed sensor in such a manner that the increasing rate of the assisting power is made smaller as the detected vehicle speed increases; and
   motor drive means responsive to said modulated signal from said signal modulation means for controlling said electric motor to vary the assisting power generated thereby depending upon said modulated signal.

4. An electric power steering device as set forth in claim 3, wherein said first control means comprises:
   storage means for storing said first characteristic which non-linearly varies the assisting power at a reference speed within said low speed range with variations in the steering effort; and
   read-out means for reading out from said storage means an assisting power corresponding to the steering effort detected by said torque sensor.

5. An electric power steering device as set forth in claim 3, wherein said second control means comprises:
   calculation means for calculating an assisting power for a second reference speed within said high speed range, based upon a constant and the steering effort detected by said torque sensor.

* * * * *